US011745175B2

(12) United States Patent
Wen et al.

(10) Patent No.: US 11,745,175 B2
(45) Date of Patent: Sep. 5, 2023

(54) PROCESS FOR IMPROVING SURFACE CATALYTIC EFFICIENCY OF CATALYST SUBSTRATE

(71) Applicant: Guangdong University of Petrochemical Technology, Maoming (CN)

(72) Inventors: Liangcheng Wen, Maoming (CN); Gengyu Cao, Maoming (CN)

(73) Assignee: Guangdong University of Petrochemical Technology, Guangdong (CN)

( * ) Notice: Subject to any disclaimer, the term of this patent is extended or adjusted under 35 U.S.C. 154(b) by 290 days.

(21) Appl. No.: 17/189,264

(22) Filed: Mar. 2, 2021

(65) Prior Publication Data
US 2021/0316293 A1    Oct. 14, 2021

(30) Foreign Application Priority Data

Apr. 13, 2020   (CN) .......................... 202010284805.9

(51) Int. Cl.
*B01J 37/16* (2006.01)
*B82Y 30/00* (2011.01)
*B82Y 40/00* (2011.01)

(52) U.S. Cl.
CPC .............. *B01J 37/16* (2013.01); *B82Y 30/00* (2013.01); *B82Y 40/00* (2013.01)

(58) Field of Classification Search
CPC ........... B01J 37/16; B82Y 30/00; B82Y 40/00
See application file for complete search history.

(56) References Cited

FOREIGN PATENT DOCUMENTS

WO    WO-2016016127 A1 *   2/2016 ......... B01D 53/8687

OTHER PUBLICATIONS

Hua et al. "Metal nanotubes prepared by a sol-gel method followed by a hydrogen reduction procedure", 2006. Nanotechnology, Institute of Physics Publishing, p. 5106-5110. (Year: 2006).*
Rouhani et al. "The effect of agarose content on the morphology, phase evolution, and magnetic properties of CoFe2O4 nanoparticles prepared by sol-gel autocombustion method", Oct. 30, 2017. Applied Ceramic Technology, The American Ceramic Society, p. 758-765. (Year: 2017).*
Han et al. "Synthesis of LiMn2O4 by modified Pechini method and characterization as a cathode for rechargeable Li/LiMn2O4 cells" , 2000. Journal of Power Sources, p. 161-168. (Year: 2000).*

(Continued)

*Primary Examiner* — Coris Fung
*Assistant Examiner* — Catriona M Corallo
(74) *Attorney, Agent, or Firm* — Cook Alex Ltd.

(57) ABSTRACT

The present disclosure discloses a process for improving the surface catalytic efficiency of a catalyst substrate. In some embodiments, to use nano-catalyst particles more efficiently, a process uses a porous substrate as a stationary phase support and disperses the nano-catalyst particles uniformly in all the internal space of the porous substrate, such that reactants flow through the porous substrate to achieve a catalytic effect. In some embodiments, the process not only improves the use efficiency of nano-catalyst particles, but also enables easier and more convenient adjustment of various parameters of a catalytic reaction.

15 Claims, 4 Drawing Sheets

1,000 × Magnification

(56) References Cited

OTHER PUBLICATIONS

Danks et al. "The evolution of 'sol-gel' chemistry as a technique for materials synthesis", 2016. Materials Horizons, Royal Society of Chemistry, p. 91-112. (Year: 2016).*
Ostafiychuk et al. "Composition, microstructure, and electrical properties control of the powders synthesized by sol-gel suto-combustion method using citric acid as the fuel", 2017. Nanoscale Research Letters, p. 1-9. (Year: 2017).*
Liu et al. "Synthesis of $LiNi_{1/3}Co_{1/3}Mn_{1/3}O_2$ nanoparticles by modified Pechini method and their enhanced rate capability", 2012. Journal of Sol-Gel Science Technology, p. 56-61. (Year: 2012).*
Tahmasebi et al. "The effect of starch addition on solution combustion synthesis of $Al_2O_3$—$ZrO_2$ nanocomposite powder using urea as fuel", 2008. Materials Chemistry and Physics, p. 156-163. (Year: 2008).*
Ji et al. "Synthesis of $CoFe_2O_4$ nanowire arrays by sol-gel template method". Chemical Physics Letters 379 (2003), p. 484-489. (Year: 2003).*

* cited by examiner 1,000✕ Magnification 5,000✕ Magnification 20,000× Magnification 20,000× Magnification

PROCESS FOR IMPROVING SURFACE CATALYTIC EFFICIENCY OF CATALYST SUBSTRATE

CROSS-REFERENCE TO RELATED APPLICATION(S)

This application claims priority benefits to Chinese Patent Application No. 202010284805.9, entitled "Process for Improving Surface Catalytic Efficiency of Catalyst Substrate" filed with the China National Intellectual Property Administration on Apr. 13, 2020.

The '805.9 application is incorporated herein by reference in its entirety.

FIELD OF THE INVENTION

The present disclosure relates to the technical field of catalyst substrate preparation, and in particular to a process for improving the surface catalytic efficiency of catalyst substrates.

At present, fossil fuels account for more than 80-90% of the total energy used by humans. However, the excessive use of fossil fuels has caused environmental impacts such as global warming and climate change. Therefore, the development of clean alternative energy has become important for mankind.

The energy released by combustion of hydrogen is about three times that release by fossil fuels. After combustion of hydrogen, water is produced, and there are no carbon emissions. Therefore, developments in hydrogen energy are important for the future of mankind.

In addition to hydrogen production technologies, developments in efficient energy utilization technologies are also important. For example, fuel cells have a high energy conversion efficiency of more than 40% and have a chance of reaching more than 90% when combining heat and power. This is an important solution to meet the need for additional energy while protecting the environment.

Furthermore, as the global population increases and the urban population density is concentrated, research on the use of nano-catalysts and surface chemistry technologies to improve the prevention and control of infectious diseases is also attracting attention.

In addition, the present disclosure can be extended into the field of industrial wastewater degradation and treatment. For example, most semiconductor plants currently convert ammonia-nitrogen wastewater into ammonium sulfate, which can be used in agriculture. However, in recent years, many countries have banned the use of the ammonium sulfate obtained by industrial wastewater conversion as agricultural fertilizer. Therefore, catalytic conversion of ammonia-nitrogen wastewater into low-polluting $NO_3^-$, $NO_2^-$ or even $N_2$ and $H_2$ with catalysts is an important scientific and technological research and development goal for the semiconductor industry as well as environmental protection.

To achieve the developments mentioned above, efficient chemical conversion reactions are essentially completed through a range of processes such as the adsorption, diffusion and desorption of reactants on the catalyst surface, which belong to the interface chemical reaction phenomena. When a particle reaches the nanometer scale, chemical activity can be substantially improved in addition to having a larger reaction surface area. Total surface energy and macroporous structure, as a catalyst, have unique effects on catalytic activity, selectivity and reactivity. The bonding state on the surface of a nanoparticle is different from that inside the particle. Incomplete coordination of surface atoms leads to an increase in surface active sites, which can have the advantages of both homogeneous and heterogeneous catalysts, increasing catalyst activity, improving selectivity, and enhancing catalyst stability.

However, nano-catalysts have some difficulties in the application of catalytic reactions. For example, the microstructure characteristics of nanomaterials are more difficult to control; relatively speaking, costs of nano-catalysts are relatively high; agglomeration of nanoparticles is obvious, and poor dispersion seems to be a loss of the advantage of high surface activity.

At present, processes of nanoparticles are quite proficient. Basic processes include physical and chemical vapor deposition, mechanical grinding, chemical solution method and atmospheric plasma. In the field of catalysts, a nano-photocatalyst is usually allowed to bind to a stationary phase substrate and a catalytic target is used as a mobile phase, so as to achieve the purpose of stable use. Generally, coating technologies, such as scraper, screen printing, and spin coating, are used to evenly disperse the catalyst on the surface of the substrate, adhesives, dispersants, and heat treatments are used to stabilize adhesion, or atmospheric plasma spraying and the like are used.

The above coating technologies have been used on the surface of the substrate, but if the nanoparticles are to be dispersed inside the substrate, the foregoing processes are not suitable. Usually, well-synthesized nanoparticles are uniformly mixed with an initial material of the substrate, followed by making a resulting composite material into a substrate. For example, a commercially available antibacterial tile is achieved by mixing a nano-active metal compound with germicidal efficacy with ceramic tile powder uniformly, followed by molding and heat treatment to complete the antibacterial tile process. However, this process causes nano-active particles to be coated by the substrate material and lose the catalytic effect. Alternatively, concentrations of precipitate solution and precipitant solution are precisely controlled and the temperature is carefully controlled, so that a precipitation reaction exhibits rapid nucleation, while crystals grow slowly to maintain the nanometer scale.

A manufactured nano-catalyst can only be used in nanometer scale to exert the expected effect thereof. For example, a fluidized bed device for converting lignin into fossil fuels is exactly to add nano-catalyst particles directly to a reaction tank and mix with reactants. Although the catalyst has a good utilization effect, it can hardly be recycled, leading to limited flexibility of use and increased cost of the reaction.

Modifications and improvements of many processes aim at increasing the operation efficiency. For example, the highest solar-to-hydrogen conversion efficiency of photo-electrochemical reactions is 17% so far. Therefore, it is necessary to further improve the conversion efficiency by modifying the nature of a catalyst material or improving the reaction environment.

SUMMARY OF THE INVENTION

In at least some embodiments, the present disclosure provides a process for improving the surface catalytic efficiency of a catalyst substrate. To use nano-catalyst particles more efficiently, at least some processes of the present disclosure use a porous substrate as a stationary phase support and disperse the nano-catalyst particles uniformly in most, if not all, the internal space of the porous substrate, so that reactants flow through the porous substrate to achieve a catalytic effect. This process not only improves the use efficiency of nano-catalyst particles, but also enables easier and more convenient adjustment of various parameters of a catalytic reaction.

A process for preparing a supported catalyst, can include the following steps:

(1) adding an amount of a coagulant and an amount of ethylene glycol to an aqueous solution of a catalyst particle reagent, heating to 120-150° C. and stirring, continuing heating until 60-80% by weight of water of the aqueous solution of the catalyst particle reagent is removed and polymerization of the ethylene glycol occurs, making the solution becomes viscous, and immersing a porous support completely in the solution until the solution completely penetrates most, if not all, pores in the porous substrate, and stopping the heating;

(2) cooling the aqueous solution to room temperature to transform the aqueous solution of the catalyst particle reagent to a jelly, the jelly filling and coating most, if not all, the pores of the porous support completely, and taking out the porous substrate to obtain a jelly-filled and coated support; and (3) pre-heating furnace to a temperature of 800-1,400° C., directly putting the jelly-filled and coated support thereinto so that a combustion reaction is conducted immediately on the jelly-filled and coated support, and maintaining the temperature in the furnace for 5-10 h to obtain the supported catalyst.

Further, in some embodiments, a method for preparing the aqueous solution of catalyst particle reagent can be as follows: dissolving one or more metal compounds in deionized water, and adding 2-2.5 times the total number of moles of metal ions of citric acid chelating agent, and continuously stirring to prepare a 0.1-1 mol/L aqueous solution of catalyst particle reagent.

Furthermore, in some embodiments, in the method for preparing the aqueous solution of catalyst particle reagent: the metal compound can be a metal carbonate or a metal nitrate or a metal ester compound; and/or after dissolving the metal compound in deionized water, adding an amount of concentrated nitric acid thereto; and/or adjusting the aqueous solution of catalyst particle reagent to a pH value of 6-7 with ammonia water.

Furthermore, in some embodiments, the amount of the nitric acid can be 10-20% of the total number of moles of metal ions of the metal compound put in the deionized water; and/or the concentrated nitric acid can have a concentration of 16 mol/L.

Further, in some embodiments, in step (1), the porous support can be completely immersed in the solution for 0.5-1 h before stopping the heating; and/or in step (1), an amount of pore former is added, along with the coagulant and ethylene glycol to the aqueous solution of catalyst particle reagent.

Further, in some embodiments, the amount of the coagulant can be 1-5% of the mass of solutes in the aqueous solution of catalyst particle reagent; and/or the coagulant can be selected from agar powder or Kanten powder; and/or the amount of the $C_2H_4(OH)_2$ (ethylene glycol) can be 2-2.5 times the total number of moles of added metal ions.

Further, in some embodiments, the amount of the pore former can be 1-5% of the mass of solutes in the aqueous solution of catalyst particle reagent; and/or the pore former can be selected from one or a mixture of more of $(NH_4)_2SO_4$, $NH_4HCO_3$ and starch.

Further, in some embodiments, in step (1), the coagulant and $C_2H_4(OH)_2$ (ethylene glycol), along with a flux, can be added to the aqueous solution of catalyst particle reagent.

Further, in some embodiments, the amount of the flux can be 0.5-3% of the mass of solutes in the aqueous solution of catalyst particle reagent, while reducing the reaction temperature of the high temperature furnace by 200-450° C. or shortening the holding time of the high temperature furnace to 0.5-2 h; and/or the flux can be selected from $Li_2CO_3$, $B_2O_3$, ZnO, $Al_2O_3$, $PbO_2$, $Bi_2O_3$, and $V_2O_5$.

Further, in some embodiments, in step (3), a reducing atmosphere can be introduced to activate catalyst particles in the process of holding the high temperature furnace.

In some embodiments of the present disclosure, a long-chain chelating polymer can be used to chelate active metal ions, so that the metal ions exhibit highly uniform dispersibility. In some embodiments of the present disclosure, a catalyst metal ion can be chelated by a chelating agent, a synthetic polymer and a coagulant aqueous solution are heated, and a porous substrate is immersed in the aqueous solution for 0.5-1 h, so that the polymer aqueous solution fully infiltrates each pore of the substrate. Once the aqueous solution is cooled down to room temperature after fully infiltrating, the catalyst aqueous solution forms a jelly-like coated porous substrate. After the substrate is taken out, the jelly-like catalyst aqueous solution is removed from the surface thereof and heated at 1,000-1,400° C. The jelly-like catalyst aqueous solution can first undergo a combustion reaction to synthesize a fluffy porous structure with finer pores, which are completely filled in the pores of the porous substrate. Subsequently, the temperature is held to strengthen the structural strength of the fluffy catalyst, and a reducing atmosphere is introduced to activate the catalyst particles. Metal ion components in the catalyst aqueous solution can include Al, Si, Cu, Ag, Ti, Zn, Li and other components, which provide support structures, reduce heat treatment temperature and/or active reactants, etc., so as to achieve the preparation of catalyst structures with different pore sizes, and reduce the heat treatment temperature, and/or improve the structural strength. In at least some embodiments, a finished porous substrate is filled with catalyst particles with a fluffy structure having finer pores, so as to achieve the effect of increasing the surface chemical reaction area and finish the nano-catalyst substrate with a high catalytic surface area.

In at least some embodiments, the present disclosure has the following beneficial effects: In the present disclosure, an internal porous substrate is formed in the pores of the porous substrate by further reaction, which maximizes, or at least increases, the space utilization of the porous substrate, increases the effective reactive surface area of a nanoparticle, and/or makes the catalytic area rise from the surface of the porous substrate to the entire three-dimensional space. In at least some embodiments, the present disclosure makes the dispersibility of the catalyst metal element more uniform through the chelating polymer. In at least some embodiments, the removable excess jelly-like catalyst of the present disclosure can be melted and reused after heating. In at least some embodiments, the present disclosure can reduce the agglomeration effect of nanoparticles by synthesizing a fluffy porous structure with finer pores. In at least some embodiments, the present disclosure can flexibly add heat treatment promoters, such as flux, which can effectively reduce the temperature and time of heat treatment. In at least some embodiments, the present disclosure can be widely applied in the binding of porous metal, alloy or ceramic substrate to nano-catalyst particles. In at least some embodiments, the present disclosure can be applied in the field of energy, such as catalytic hydrogen production and preparation of cathode and anode of solid oxide fuel cell (SOFC). In at least some embodiments, the present disclosure can be applied in the field of antibacterial disinfection, such as a filter for mite removing, disinfection and sterilization in an air purifier. In at least some embodiments, the present disclosure can be applied in the field of industrial wastewater degradation and treatment. For example, catalytic conversion of the ammonia wastewater at the end of the production line of a semiconductor factory into low-polluting $NO_3^-$, $NO_2^-$ or even $N_2$ and $H_2$ with catalysts is an important scientific and technological research and development goal for the semiconductor industry and environmental protection.

DETAILED DESCRIPTION OF ILLUSTRATIVE EMBODIMENT(S)

Figure 1:
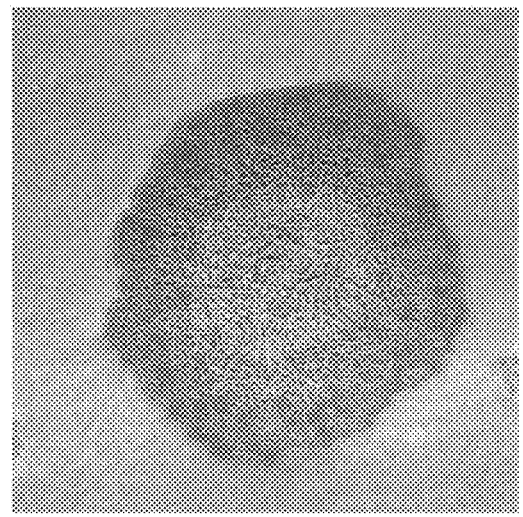
FIG. 1 shows a magnified (1000×) SEM photograph of a catalyst substrate prepared in Example 1.

The present disclosure is described in detail below with reference to the examples, but the implementation of the present disclosure is not limited thereto. Various substitutions and alterations made based on ordinary skills and conventional means in the art without departing from the above technical ideas of the present disclosure are included in the scope of the present disclosure.

Chemicals used in the examples of the present disclosure are listed as follows:
Chemical
$Al(NO_3)_3 \cdot 9H_2O$
$Li_2O_3Si$
$Li_2CO_3$
$AgNO_3$
$Ni(NO_3)_2 \cdot 6H_2O$
$Ti(OC_4H_9)_4$
$Cu(NO_3)_2 \cdot 3H_2O$
$Zn(NO_3)_2 \cdot 6H_2O$
$HNO_{3(aq)}$
$CH_3COCH_3$
$C_6H_8O_7$ (citric acid)
Starch
Kanten powder The examples of the present disclosure provide processes for improving the surface catalytic efficiency of a catalyst substrate, without adding a pore former and a flux. The processes can include the following steps:

(1) Dissolving $Al(NO_3)_3 \cdot 9H_2O$ (0-0.3 g), $Li_2O_3Si$ (0-0.3 g), $Ni(NO_3)_2 \cdot 6H_2O$ (0-0.3 g), $Cu(NO_3)_2 \cdot 3H_2O$ (0-0.3 g), $AgNO_3$ (0-0.3 g), $Zn(NO_3)_2 \cdot 6H_2O$ (0-0.3 g), and $Ti(OC_4H_9)_4$ (0-0.3 g) in 100 mL of deionized water, mixed with 2-2.5 times the total number of moles of metal ions of citric acid chelating agent, and continuously stirred. If any catalyst compound is not easily dissolve, adding an additional 16 mol/L of concentrated nitric acid (10-20% of the total number of moles of metal ions of the metal compound put in the deionized water) to help dissolve and prepare a 0.1-1 mol/L aqueous solution of catalyst particle reagent (optional selection, mixing and combination of the foregoing metal compounds can achieve the preparation of the 0.1-1 mol/L catalyst particle reagent aqueous solution and obtain similar effects, and the amount of each metal compound used is within the above range; the nitric acid is used when the metal compound is difficult to dissolve; in case of preparation with 100 mL of deionized water, 5 mL of nitric acid can be added to the solution each time to indicate that the metal compound is completely dissolved; the specific amount depends on the combination of the metal compounds, and the amount ranges from 10% to 20% of the total number of moles of metal ions).

(2) After the added reagent is completely dissolved, the pH is adjusted to 6-7 with ammonia water. If the pH is too low, citric acid will not easily deprotonate to chelate the metal ions; if the pH is too high, the metal ions will easily form colloidal hydroxides. If $Li_2O_3Si$ is added, it should be added after the pH of the solution is neutral, avoiding colloidization of $Li_2O_3Si$ in acidic solution.

(3) After adjusting the pH value, 2.5 times the moles of the sample of $C_2H_4(OH)_2$ (ethylene glycol) can be added along with 1% of the total solute weight of agar powder or Kanten powder, heated on a heater plate to remove excess water until 60-80% by weight of the water is removed and the solution forms a slightly viscous polymer.

(4) The porous alumina substrate can be placed and immersed completely in the solution for 0.5-1 h, until the solution completely penetrates most, if not all, the pores inside the substrate.

(5) The heating is stopped, and when the solution drops to room temperature, the catalyst solution becomes jelly-like and completely covers most, if not all, the voids of the porous alumina substrate. The substrate is taken out and the jelly-like catalyst is removed from the surface of the substrate.

(6) A high temperature furnace is preheated to 800-1,400° C.

(7) A catalyst-coated porous substrate is placed into the high temperature furnace to immediately undergo a combustion reaction and the temperature of the high temperature furnace can be held for 10 h. A reducing hydrogen atmosphere can be introduced to activate catalyst particles in the holding process. After ignition and combustion, a fluffy porous structure with finer pores is formed and completely fills in the pores of the porous substrate.

The process of the nano-catalyst substrate is further described in detail below with reference to Examples 1 to 6.

EXAMPLE 1

A process for improving the surface catalytic efficiency of a catalyst substrate without adding a pore former and a flux, can include the following steps:

(1) Dissolving $Al(NO_3)_3 \cdot 9H_2O$ (0-0.3 g), $Li_2O_3Si$ (0-0.3 g), $Ni(NO_3)_2 \cdot 6H_2O$ (0-0.3 g), $Cu(NO_3)_2 \cdot 3H_2O$ (0-0.3 g), $AgNO_3$ (0-0.3 g), $Zn(NO_3)_2 \cdot 6H_2O$ (0-0.3 g), and $Ti(OC_4H_9)_4$ (0-0.3 g) in 100 mL of deionized water, mixed with 2 times the total number of moles of metal ions of citric acid chelating agent, and continuously stirred. If any catalyst compound is not easily dissolved, adding additional 16 mol/L concentrated nitric acid (10-20% of the total number of moles of metal ions of the metal compound put in the deionized water) to help dissolve and prepare a 0.5 mol/L aqueous solution of catalyst particle reagent.

(2) After the added reagent is completely dissolved, the pH is adjusted to 6-7 with ammonia water. If the pH is too low, citric acid will not easily deprotonate to chelate the metal ions; if the pH is too high, the metal ions will easily form colloidal hydroxides. If $Li_2O_3Si$ is added, it should be added after the pH of the solution is neutral, avoiding colloidization of $Li_2O_3Si$ in acidic solution.

(3) After adjusting the pH value, 2.5 times the moles of the sample of $C_2H_4(OH)_2$ (ethylene glycol) is added along with 1% of the total solute weight of agar powder, heated up to 120-150° C. and stirred on a heater plate; excess water is removed until 60-80% by weight of the water is removed and the solution forms a slightly viscous polymer.

(4) A porous alumina substrate is placed and immersed completely in the solution for 0.5 h, until the solution completely penetrates most, if not all, pores inside the substrate.

(5) The heating is stopped, and when the solution drops to room temperature, the catalyst solution becomes jelly-like and completely covers most, if not all, the voids of the porous alumina substrate. The substrate is taken out and the jelly-like catalyst is removed from the surface of the substrate.

(6) A high temperature furnace is preheated to 1,400° C.

Figure 2:
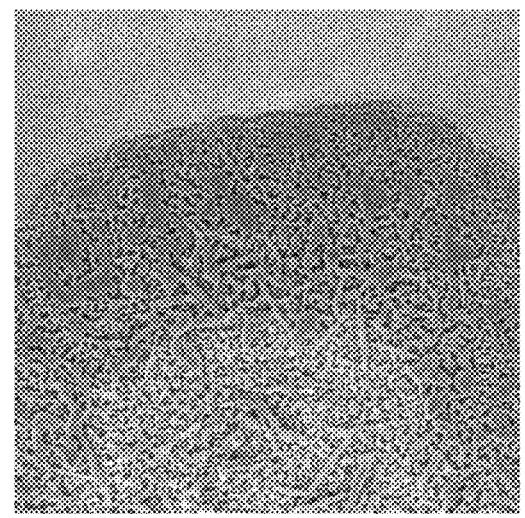
FIG. 2 shows a magnified (5000×) SEM photograph of a catalyst substrate prepared in Example 1.

(7) A catalyst-coated porous substrate is placed into the high temperature furnace to immediately undergo a combustion reaction and the temperature of the high temperature furnace is held for 10 h. A reducing hydrogen atmosphere is introduced to activate catalyst particles in the holding process. After ignition and combustion, a fluffy porous structure with finer pores is formed and completely filled in the pores of the porous substrate, and the obtained nanometer scale is about 200 nm to 1 μm, as shown in FIG. 1 and FIG. 2.

EXAMPLES 2 TO 5

The process is the same as that in Example 1, except for the concentration of the prepared aqueous solution of catalyst particle reagent. Specific methods for preparing the aqueous solution of catalyst particle reagent are listed in the following table:

| | Preparation Method |
|---|---|
| Example 2 | $Al(NO_3)_3·9H_2O$ (0-0.3 g), $Li_2O_3Si$ (0-0.3 g), $Ni(NO_3)_2·6H_2O$ (0-0.3 g), $Cu(NO_3)_2·3H_2O$ (0-0.3 g), $AgNO_3$ (0-0.3 g), $Zn(NO_3)_2·6H_2O$ (0-0.3 g), and $Ti(OC_4H_9)_4$ (0-0.3 g) are dissolved in 100 mL of deionized water, mixed with 2 times the total number of moles of metal ions of citric acid chelating agent, and continuously stirred. If any catalyst compound is not easily dissolved, add additional 16 mol/L concentrated nitric acid (10-20% of the total number of moles of metal ions of the metal compound put in the deionized water) to help dissolve and prepare a 0.1 mol/L aqueous solution of catalyst particle reagent. |
| Example 3 | $Al(NO_3)_3·9H_2O$ (0-0.3 g), $Li_2O_3Si$ (0-0.3 g), $Ni(NO_3)_2·6H_2O$ (0-0.3 g), $Cu(NO_3)_2·3H_2O$ (0-0.3 g), $AgNO_3$ (0-0.3 g), $Zn(NO_3)_2·6H_2O$ (0-0.3 g), and $Ti(OC_4H_9)_4$ (0-0.3 g) are dissolved in 100 mL of deionized water, mixed with 2 times the total number of moles of metal ions of citric acid chelating agent, and continuously stirred. If any catalyst compound is not easily dissolved, add additional 16 mol/L concentrated nitric acid (10-20% of the total number of moles of metal ions of the metal compound put in the deionized water) to help dissolve and prepare a 0.3 mol/L aqueous solution of catalyst particle reagent. |
| Example 4 | $Al(NO_3)_3·9H_2O$ (0-0.3 g), $Li_2O_3Si$ (0-0.3 g), $Ni(NO_3)_2·6H_2O$ (0-0.3 g), $Cu(NO_3)_2·3H_2O$ (0-0.3 g), $AgNO_3$ (0-0.3 g), $Zn(NO_3)_2·6H_2O$ (0-0.3 g), and $Ti(OC_4H_9)_4$ (0-0.3 g) are dissolved in 100 mL of deionized water, mixed with 2.5 times the total number of moles of metal ions of citric acid chelating agent, and continuously stirred. If any catalyst compound is not easily dissolved, add additional 16 mol/L concentrated nitric acid (10-20% of the total number of moles of metal ions of the metal compound put in the deionized water) to help dissolve and prepare a 0.8 mol/L aqueous solution of catalyst particle reagent. |
| Example 5 | $Al(NO_3)_3·9H_2O$ (0-0.3 g), $Li_2O_3Si$ (0-0.3 g), $Ni(NO_3)_2·6H_2O$ (0-0.3 g), $Cu(NO_3)_2·3H_2O$ (0-0.3 g), $AgNO_3$ (0-0.3 g), $Zn(NO_3)_2·6H_2O$ (0-0.3 g), and $Ti(OC_4H_9)_4$ (0-0.3 g) are dissolved in 100 mL of deionized water, mixed with 2.5 times the total number of moles of metal ions of citric acid chelating agent, and continuously stirred. If any catalyst compound is not easily dissolved, add additional 16 mol/L concentrated nitric acid (10-20% of the total number of moles of metal ions of the metal compound put in the deionized water) to help dissolve and prepare a 1 mol/L aqueous solution of catalyst particle reagent. |

EXAMPLE 6

Figure 3:
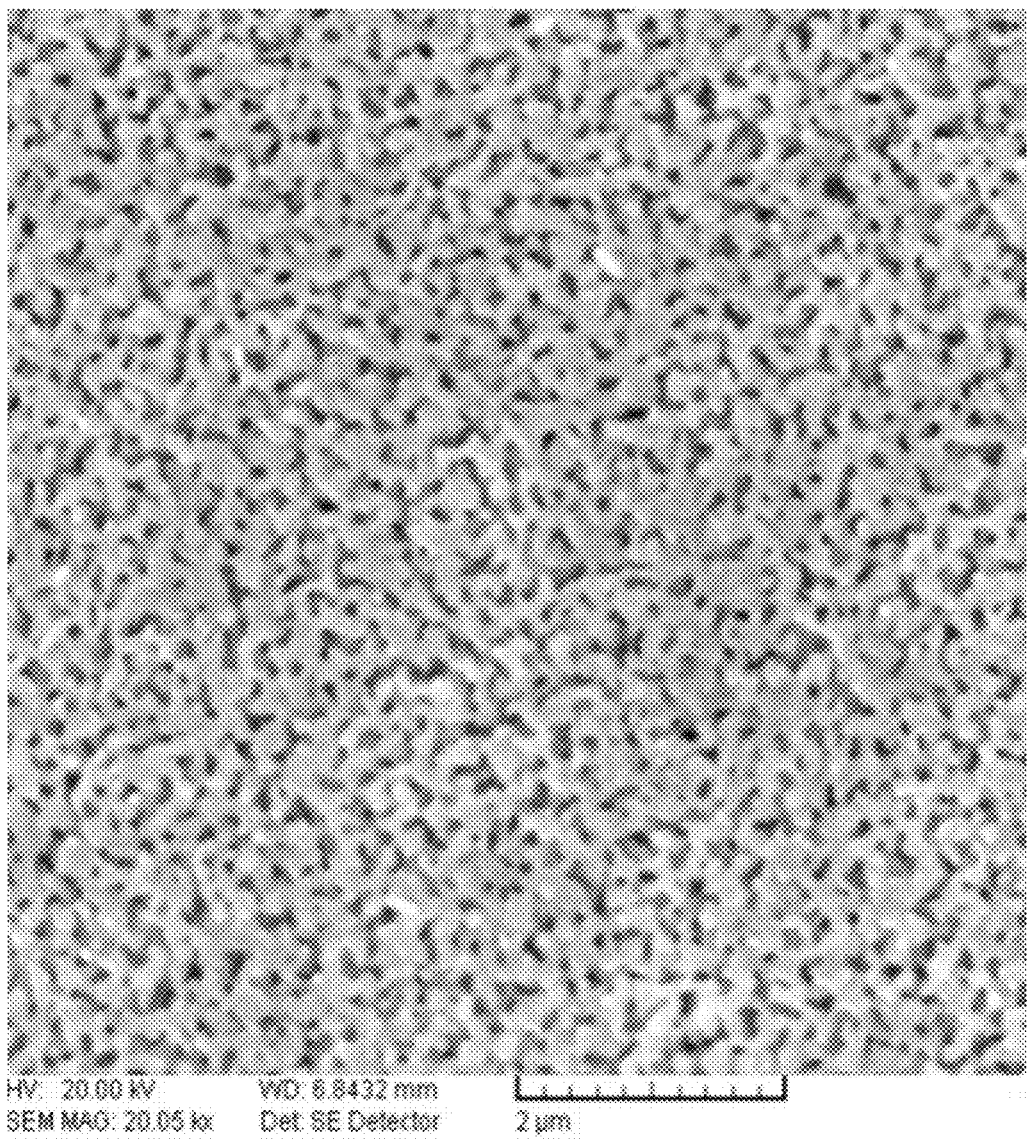
FIG. 3 shows a magnified (20000×) SEM photograph of a catalyst substrate prepared in Example 6.

The process is the same as that in Example 1, except for the heat treatment temperature. In this example, the high temperature furnace is heated to 800° C. The nanometer scale obtained in this example is smaller, about 20-80 nm, as shown in FIG. 3.

The examples of the present disclosure provide a process for improving the surface catalytic efficiency of a catalyst substrate, with adding a pore former and a flux and reducing the heat treatment temperature and holding time, including the following steps:

(1) Dissolving $Al(NO_3)_3·9H_2O$ (0-0.3 g), $Li_2O_3Si$ (0-0.3 g), $Ni(NO_3)_2·6H_2O$ (0-0.3 g), $Cu(NO_3)_2·3H_2O$ (0-0.3 g), $AgNO_3$ (0-0.3 g), $Zn(NO_3)_2·6H_2O$ (0-0.3 g), and $Ti(OC_4H_9)_4$ (0-0.3 g) in 100 mL of deionized water, mixed with 2-2.5 times the total number of moles of metal ions of citric acid chelating agent, and continuously stirred. If any catalyst compound is not easily dissolved, add additional 16 mol/L concentrated nitric acid (10-20% of the total number of moles of metal ions of the metal compound put in the deionized water) to help dissolve and prepare a 0.1-1 mol/L aqueous solution of catalyst particle reagent (optional selection, mixing and combination of the foregoing metal compounds can achieve the preparation of the 0.1-1 mol/L catalyst particle reagent aqueous solution and obtain similar effects, and the amount of each metal compound used is within the above range; the nitric acid is used when the metal compound is difficult to dissolve; in case of preparation with 100 mL of deionized water, 5 mL of nitric acid is usually added to the solution each time to indicate that the metal compound is completely dissolved; the specific amount depends on the combination of the metal compounds, and the amount ranges from 10% to 20% of the total number of moles of metal ions).

(2) After the added reagent is completely dissolved, the pH is adjusted to 6-7 with ammonia water. If the pH is too low, citric acid will not easily deprotonate to chelate the metal ions; if the pH is too high, the metal ions will easily form colloidal hydroxides. If $Li_2O_3Si$ is added, it should be added after the pH of the solution is neutral, avoiding colloidization of $Li_2O_3Si$ in acidic solution.

(3) After adjusting the pH value, 2.5 times the moles of the sample of $C_2H_4(OH)_2$ (ethylene glycol) is added along with 1% of the total solute weight of agar powder or Kanten powder, 3% starch and 0.5% $Li_2CO_3$, and heated on a heater plate until completely dissolved; excess water is removed until 60-80% by weight of the water is removed and the solution forms a slightly viscous polymer.

(4) The porous alumina substrate is placed and immersed completely in the solution for 0.5-1 h, until the solution completely penetrates most, if not all, the pores inside the substrate.

(5) The heating is stopped, and when the solution drops to room temperature, the catalyst solution becomes jelly-like and completely covers all the voids of the porous alumina substrate. The substrate is taken out and the jelly-like catalyst is removed from the surface of the substrate.

(6) A high temperature furnace is preheated to 1,000° C.

(7) A catalyst-coated porous substrate is placed into the high temperature furnace to immediately undergo a combustion reaction and the temperature of the high temperature furnace is held for 2 h. A reducing hydrogen atmosphere is introduced to activate catalyst particles in the holding process.

(8) After ignition and combustion, a fluffy porous structure with finer pores is formed and completely filled in the pores of the porous substrate.

The process of the nano-catalyst substrate will be further described in detail below with reference to Examples 7 to 11.

EXAMPLE 7

Provided is a process for improving the surface catalytic efficiency of a catalyst substrate, with adding a pore former and a flux and reducing the heat treatment temperature and holding time, including the following steps:

(1) Dissolving $Al(NO_3)_3 \cdot 9H_2O$ (0-0.3 g), $Li_2O_3Si$ (0-0.3 g), $Ni(NO_3)_2 \cdot 6H_2O$ (0-0.3 g), $Cu(NO_3)_2 \cdot 3H_2O$ (0-0.3 g), $AgNO_3$ (0-0.3 g), $Zn(NO_3)_2 \cdot 6H_2O$ (0-0.3 g), and $Ti(OC_4H_9)_4$ (0-0.3 g) in 100 mL of deionized water, mixed with 2 times the total number of moles of metal ions of citric acid chelating agent, and continuously stirred. If any catalyst compound is not easily dissolved, add additional 16 mol/L concentrated nitric acid (10-20% of the total number of moles of metal ions of the metal compound put in the deionized water) to help dissolve and prepare a 0.5 mol/L aqueous solution of catalyst particle reagent.

(2) After the added reagent is completely dissolved, the pH is adjusted to 6-7 with ammonia water. If the pH is too low, citric acid will not easily deprotonate to chelate the metal ions; if the pH is too high, the metal ions will easily form colloidal hydroxides. If $Li_2O_3Si$ is added, it should be added after the pH of the solution is neutral, avoiding colloidization of $Li_2O_3Si$ in acidic solution.

(3) After adjusting the pH value, 2.5 times the moles of the sample of $C_2H_4(OH)_2$ (ethylene glycol) is added along with 1% of the total solute weight of agar powder or Kanten powder, 3% starch and 0.5% $Li_2CO_3$, and heated up to 120-150° C. and stirred on a heater plate until completely dissolved; excess water is removed until 60-80% by weight of the water is removed and the solution forms a slightly viscous polymer.

(4) A porous alumina substrate is placed and immersed completely in the solution for 1 h, until the solution completely penetrates most, if not all, the pores inside the substrate.

(5) The heating is stopped, and when the solution drops to room temperature, the catalyst solution becomes jelly-like and completely covered all the voids of the porous alumina substrate. The substrate is taken out and the jelly-like catalyst is removed from the surface of the substrate.

(6) A high temperature furnace is preheated to 1,000° C.

(7) A catalyst-coated porous substrate is placed into the high temperature furnace to immediately undergo a combustion reaction and the temperature of the high temperature furnace is held for 2 h. A reducing hydrogen atmosphere is introduced to activate catalyst particles in the holding process.

Figure 4:
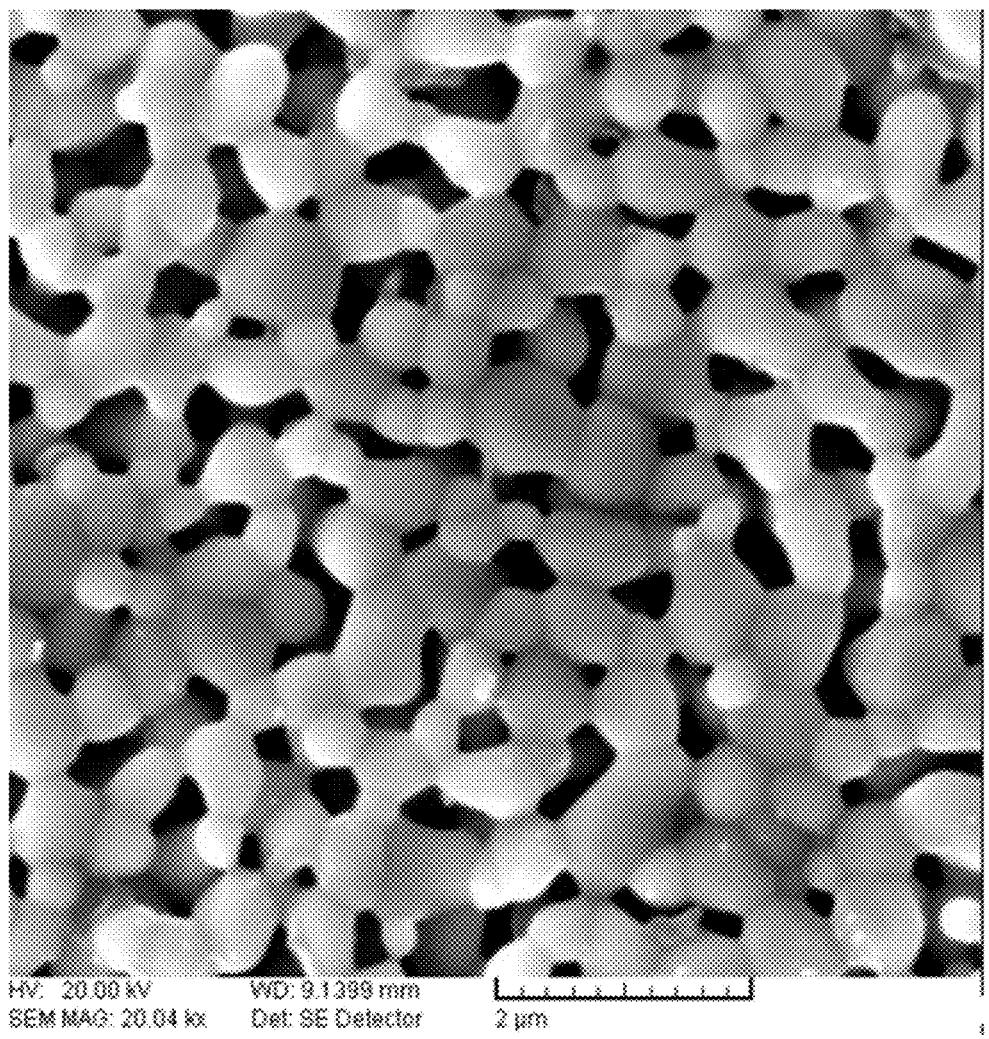
FIG. 4 shows a magnified (20000×) SEM photograph of a catalyst substrate prepared in Example 7.

(8) After ignition and combustion, a fluffy porous structure with finer pores is formed and completely fills in the pores of the porous substrate, and the obtained nanometer scale is about 50-200 nm. The apparent structure is relatively solid with higher crystallinity, as shown in FIG. 4.

EXAMPLES 8 TO 11

The process is the same as that in Example 1, except for the concentration of the prepared aqueous solution of catalyst particle reagent. Specific methods for preparing the aqueous solution of catalyst particle reagent are listed in the following table:

| | Preparation method |
|---|---|
| Example 8 | $Al(NO_3)_3 \cdot 9H_2O$ (0-0.3 g), $Li_2O_3Si$ (0-0.3 g), $Ni(NO_3)_2 \cdot 6H_2O$ (0-0.3 g), $Cu(NO_3)_2 \cdot 3H_2O$ (0-0.3 g), $AgNO_3$ (0-0.3 g), $Zn(NO_3)_2 \cdot 6H_2O$ (0-0.3 g), and $Ti(OC_4H_9)_4$ (0-0.3 g) are dissolved in 100 mL of deionized water, mixed with 2 times the total number of moles of metal ions of citric acid chelating agent, and continuously stirred If any catalyst compound is not easily dissolved, add additional 16 mol/L concentrated nitric acid (10-20% of the total number of moles of metal ions of the metal compound put in the deionized water) to help dissolve and prepare a 0.1 mol/L aqueous solution of catalyst particle reagent. |
| Example 9 | $Al(NO_3)_3 \cdot 9H_2O$ (0-0.3 g), $Li_2O_3Si$ (0-0.3 g), $Ni(NO_3)_2 \cdot 6H_2O$ (0-0.3 g), $Cu(NO_3)_2 \cdot 3H_2O$ (0-0.3 g), $AgNO_3$ (0-0.3 g), $Zn(NO_3)_2 \cdot 6H_2O$ (0-0.3 g), and $Ti(OC_4H_9)_4$ (0-0.3 g) are dissolved in 100 mL of deionized water, mixed with 2 times the total number of moles of metal ions of citric acid chelating agent, and continuously stirred. If any catalyst compound is not easily dissolved, add additional 16 mol/L concentrated nitric acid (10-20% of the total number of moles of metal ions of the metal compound put in the deionized water) to help dissolve and prepare a 0.3 mol/L aqueous solution of catalyst particle reagent. |
| Example 10 | $Al(NO_3)_3 \cdot 9H_2O$ (0-0.3 g), $Li_2O_3Si$ (0-0.3 g), $Ni(NO_3)_2 \cdot 6H_2O$ (0-0.3 g), $Cu(NO_3)_2 \cdot 3H_2O$ (0-0.3 g), $AgNO_3$ (0-0.3 g), $Zn(NO_3)_2 \cdot 6H_2O$ (0-0.3 g), and $Ti(OC_4H_9)_4$ (0-0.3 g) are dissolved in 100 mL of deionized water, mixed with 2.5 times the total number of moles of metal ions of citric acid chelating agent, and continuously stirred. If any catalyst compound is not easily dissolved, add additional 16 mol/L concentrated nitric acid (10-20% of the total number of moles of metal ions of the metal compound put in the deionized water) to help dissolve and prepare a 0.8 mol/L aqueous solution of catalyst particle reagent. |
| Example 11 | $Al(NO_3)_3 \cdot 9H_2O$ (0-0.3 g), $Li_2O_3Si$ (0-0.3 g), $Ni(NO_3)_2 \cdot 6H_2O$ (0-0.3 g), $Cu(NO_3)_2 \cdot 3H_2O$ (0-0.3 g), $AgNO_3$ (0-0.3 g), $Zn(NO_3)_2 \cdot 6H_2O$ (0-0.3 g), and $Ti(OC_4H_9)_4$ (0-0.3 g) are dissolved in 100 mL of deionized water, mixed with 2.5 times the total number of moles of metal ions of citric acid chelating agent, and continuously stirred. If any catalyst compound is not easily dissolved, add additional 16 mol/L concentrated nitric acid (10-20% of the total number of moles of metal ions of the metal compound put in the deionized water) to help dissolve and prepare a 1 mol/L aqueous solution of catalyst particle reagent. |

Figure 5:
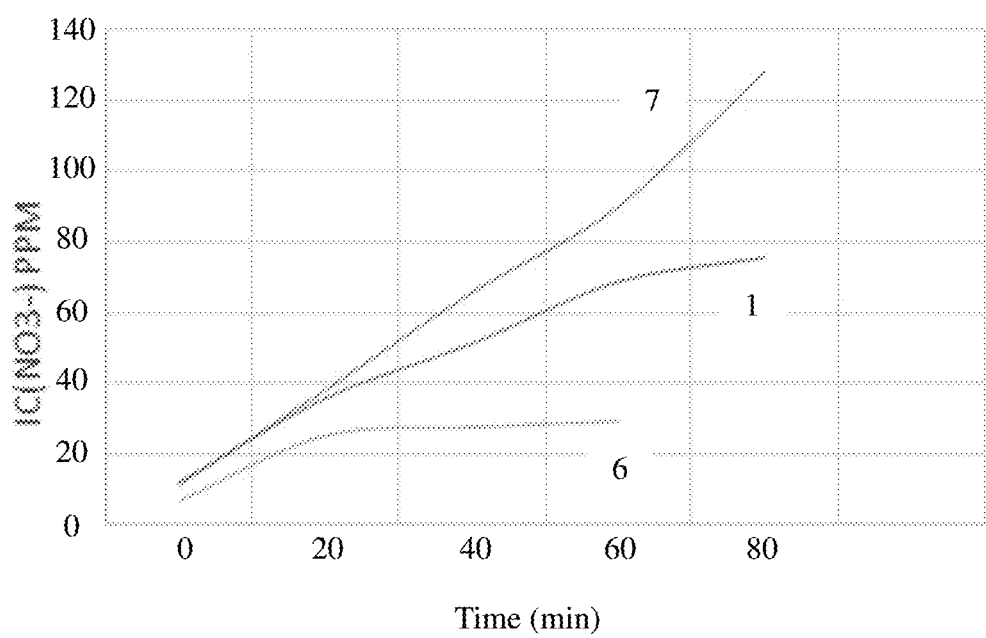
FIG. 5 illustrates a comparison of ammonia-nitrogen conversion in a catalytic performance test for the catalyst substrates prepared in Examples 1, 6, and 7.

In a test, the nano-catalyst substrates completed in Examples 1, 6, and 7 were put into a catalytic performance testing device, respectively; ammonia gas was pass through the catalyst, while circulating continuously for 60-70 min and finally introducing into the aqueous solution to collect. $NO_3^-$ concentrations were determined by IC to observe the catalyst conversion ability, as shown in FIG. 5, and it was found that Examples 1, 6, and 7 were all effective. Moreover, Example 7 had a better structure and the optimal effect.

It should be noted that relational terms herein such as first and second are only used to distinguish one entity or operation from another entity or operation without necessarily requiring or implying any actual such relationship or order between such entities or operations. Moreover, the terms "include", "including" or any other variants thereof are intended to cover non-exclusive inclusion, so that a process, method, article or terminal device including a series of elements not only includes those elements, but also includes those elements that are not explicitly listed, or also includes elements inherent to this process, method, article or terminal device. Without more limitations, the elements defined by the sentence "include . . . " or "including . . . " do not exclude the existence of other elements in the process, method, article, or terminal device that includes the elements. In addition, herein, "greater than", "less than", "more than", etc. are understood as not including the number; "above", "below", "within", etc. are understood as including the number.

Although the foregoing examples have been described, those skilled in the art can make additional alterations and modifications to these examples once they learn the basic creative concept. Therefore, the above are only the examples of the present disclosure, but not intended to limit the scope of the present disclosure. Any equivalent structure or equivalent process transformation made by using the content of the description and drawings of the present disclosure, or directly or indirectly applied to other related technical fields, are included in the scope of the present disclosure.

What is claimed is:

1. A process for preparing a supported catalyst, comprising:
   (1) adding an amount of a coagulant and an amount of ethylene glycol to an aqueous solution of a catalyst particle reagent, heating to 120-150° C. and stirring, continuing heating until 60-80% by weight of water of said aqueous solution of said catalyst particle reagent is removed and polymerization of the ethylene glycol occurs, making said aqueous solution become viscous, and
   immersing a porous support completely in said aqueous solution until said aqueous solution completely penetrates all pores in the porous support, and stopping the heating,
      wherein the aqueous solution of said catalyst particle reagent is prepared by a method comprising
         dissolving at least one metal compound in deionized water,
         adding citric acid in an amount of 2-2.5 times a total molar number of metal ions of the at least one metal compound, and
         continuously stirring to prepare a 0.1-1 mol/L aqueous solution of said catalyst particle reagent;
   (2) cooling the aqueous solution to room temperature to transform the aqueous solution of the catalyst particle reagent to a jelly, the jelly filling and coating all the pores of the porous support completely, to obtain a jelly-filled and coated support; and
   (3) pre-heating a furnace to a temperature of 1,000-1,400° C., directly putting a the jelly-filled and coated support thereinto so that a combustion reaction is conducted immediately on the jelly-filled and coated support, and maintaining the temperature in the furnace for 5-10 hours to obtain the supported catalyst.

2. The process of claim 1, wherein at least one of the following (a) to (c) is applied:
   (a) said at least one metal compound is one selected from the group consisting of a metal carbonate, a metal nitrate, and a metal ester compound;
   (b) the method in step (1) further comprises after dissolving said at least one metal compound in deionized water, adding an amount of concentrated nitric acid thereto; and
   (c) the method in step (1) further comprises adjusting the aqueous solution of said catalyst particle reagent to a pH value of 6-7 with ammonia water.

3. The process of claim 2, wherein after dissolving said at least one metal compound in deionized water, said amount of concentrated nitric acid is added thereto, and at least one of the following (a) and (b) is applied:
   (a) an amount of nitric acid in said amount of concentrated nitric acid is 10-20% of a total molar number of metal ions of said at least one metal compound put in the deionized water; and
   (b) the concentrated nitric acid has a concentration of 16 mol/L.

4. The process of claim 3, wherein in step (1), at least one of the following (a) and (b) is applied:
   (a) the porous support is completely immersed in said aqueous solution for 0.5-1 hour; and
   (b) a pore former is added, along with the coagulant and ethylene glycol, to the aqueous solution of the catalyst particle reagent.

5. The process of claim 3, wherein at least one of the following (a) to (c) is applied:
   (a) the amount of the coagulant is 1-5% of a mass of the at least one metal compound in the aqueous solution of the catalyst particle reagent;
   (b) the coagulant is one selected from the group consisting of agar powder and Kanten powder; and
   (c) the amount of the ethylene glycol is 2-2.5 times the total molar number of metal ions of said at least one metal compound put in the deionized water.

6. The process of claim 3, wherein in step (1), a flux is added, along with the coagulant and the ethylene glycol, to the aqueous solution of the catalyst particle reagent.

7. The process of claim 2, wherein in step (1), at least one of the following (a) and (b) is applied:
   (a) the porous support is completely immersed in said aqueous solution for 0.5-1 hour; and
   (b) a pore former is added, along with the coagulant and ethylene glycol, to the aqueous solution of the catalyst particle reagent.

8. The process of claim 2, wherein at least one of the following (a) to (c) is applied:
   (a) the amount of the coagulant is 1-5% of a mass of the at least one metal compound in the aqueous solution of the catalyst particle reagent;
   (b) the coagulant is one selected from the group consisting of agar powder and Kanten powder; and
   (c) the amount of the ethylene glycol is 2-2.5 times a total molar number of metal ions of said at least one metal compound put in the deionized water.

9. The process of claim 2, wherein in step (1), a flux is added, along with the coagulant and the ethylene glycol, to the aqueous solution of the catalyst particle reagent.

10. The process of claim 1, wherein in step (1), at least one of the following (a) and (b) is applied:

(a) the porous support is completely immersed in said aqueous solution for 0.5-1 hour; and
(b) an amount of a pore former is added, along with the coagulant and ethylene glycol, to the aqueous solution of the catalyst particle reagent.

11. The process of claim 10, wherein said amount of said pore former is added, along with the coagulant and ethylene glycol, to the aqueous solution of the catalyst particle reagent, and at least one of the following (a) and (b) is applied:
(a) the amount of the pore former is 1-5% of a mass of the at least one metal compound in the aqueous solution of the catalyst particle reagent; and
(b) the pore former is at least one selected from the group consisting of $(NH_4)_2SO_4$, $NH_4HCO_3$ and starch.

12. The process of claim 1, wherein at least one of the following (a) to (c) is applied:
(a) the amount of the coagulant is 1-5% of a mass of the at least one metal compound in the aqueous solution of the catalyst particle reagent;
(b) the coagulant is one selected from the group consisting of agar powder and Kanten powder; and
(c) the amount of the ethylene glycol is 2-2.5 times a total molar number of metal ions of said at least one metal compound put in the deionized water.

13. The process of claim 1, wherein in step (1), an amount of a flux is added, along with the coagulant and the ethylene glycol, to the aqueous solution of the catalyst particle reagent.

14. The process of claim 13, wherein at least one of the following (a) to (b) is applied:
(a) the amount of the flux is 0.5-3% of a mass of the at least one metal compound in the aqueous solution of the catalyst particle reagent, while reducing a reaction temperature of the furnace by 200-450° C. or shortening a maintaining time of the furnace to 0.5-2 hours; and
(b) the flux is at least one selected from the group consisting of $Li_2CO_3$, $B_2O_3$, ZnO, $Al_2O_3$, $PbO_2$, $Bi_2O_3$, and $V_2O_5$.

15. The process of claim 1, wherein in step (3), a reducing atmosphere is introduced to activate catalyst particles in the process of maintaining the temperature in the furnace.

* * * * *